(12) United States Patent
Asaka

(10) Patent No.: US 11,979,691 B2
(45) Date of Patent: May 7, 2024

(54) PROJECTION APPARATUS

(71) Applicant: CANON KABUSHIKI KAISHA, Tokyo (JP)

(72) Inventor: Takashi Asaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 192 days.

(21) Appl. No.: 17/578,181

(22) Filed: Jan. 18, 2022

(65) Prior Publication Data
US 2022/0232195 A1 Jul. 21, 2022

(30) Foreign Application Priority Data

Jan. 20, 2021 (JP) ................. 2021-007252

(51) Int. Cl.
*H04N 9/31* (2006.01)
*G06F 3/04842* (2022.01)
*G06F 3/04855* (2022.01)
*G06F 3/04883* (2022.01)

(52) U.S. Cl.
CPC ....... *H04N 9/3185* (2013.01); *G06F 3/04842* (2013.01); *G06F 3/04855* (2013.01); *G06F 3/04883* (2013.01); *H04N 9/3188* (2013.01)

(58) Field of Classification Search
None
See application file for complete search history.

(56) References Cited

U.S. PATENT DOCUMENTS

| 10,048,905 | B2 | 8/2018 | Imai | |
| 2009/0207383 | A1* | 8/2009 | Hirahara | H04N 5/74 353/69 |
| 2016/0282968 | A1* | 9/2016 | Henninen | H04N 9/31 |
| 2019/0065047 | A1* | 2/2019 | Kang | G06F 3/04855 |

FOREIGN PATENT DOCUMENTS

| JP | 2009-053769 A | 3/2009 |
| JP | 2013-143001 A | 7/2013 |
| JP | 2016-184212 A | 10/2016 |
| JP | 2017-169086 A | 9/2017 |

* cited by examiner

*Primary Examiner* — Frank S Chen
(74) *Attorney, Agent, or Firm* — Cowan, Liebowitz & Latman, P.C.

(57) ABSTRACT

A projection apparatus according to the present invention, includes: a projection optical system configured to project an input image onto a projection plane, and at least one memory and at least one processor which function as: a position-detecting unit configured to detect a position pointed to by a pointer on the projection plane; and a control unit configured to perform control so that the projection optical system projects the input image and projects a graphic at the position detected by the position-detecting unit, wherein in a case where an image is scrolled in a specific range of the input image, the control unit performs control so that the graphic corresponding to the specific range moves in a direction in accordance with the scrolling.

14 Claims, 9 Drawing Sheets

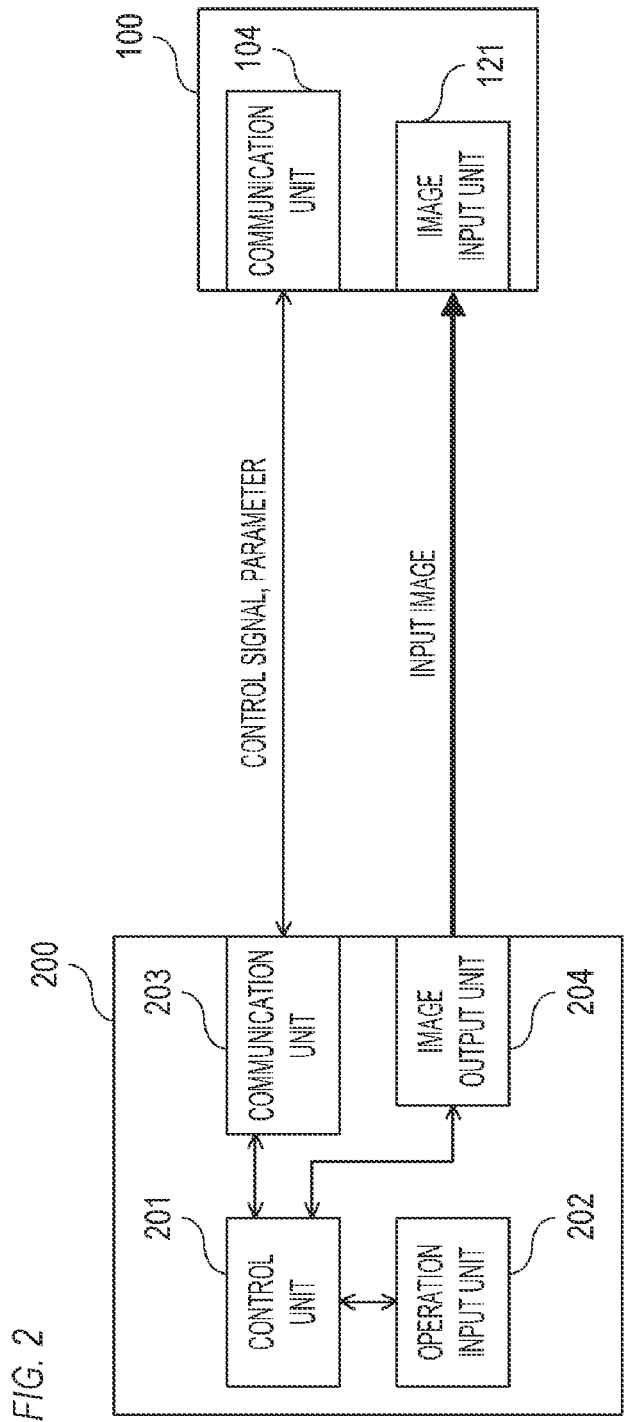

INPUT IMAGE

GRAPHIC

DELETE

PROJECTION APPARATUS

BACKGROUND OF THE INVENTION

Field of the Invention

The present invention relates to a projection apparatus.

Description of the Related Art

With a projection apparatus known as an "interactive projector", when a user points to a position on a projection plane using a pointer such as a digital pen, an input image is projected onto the projection plane, and also a graphic is projected at a position pointed to by the pointer. Thereby the user can add information on the projection plane with the same ambience as handwriting. However, if the input image changes in a state where the graphic is displayed (projected) using the pointer, this graphic is displayed in a form unintended by the user. In the following description, the term "graphic" refers to a graphic formed by the pointer.

For example, as illustrated in FIG. 11A, it is assumed that an underline of a specific text is displayed as a graphic, in order to emphasize the specific text in an input image. If the text is scrolled thereafter within the input image, as illustrated in FIG. 11B, the position where the graphic is displayed (display position; projection position) is unchanged, so the graphic is no longer the underlined graphic of a specific text.

Further, as illustrated in FIG. 12A, it is assumed that a supplementary explanation for a specific pattern in a window (application window) is displayed as a graphic. If the window is moved or zoomed in/out (enlarged/reduced) thereafter, as illustrated in FIG. 12B, the position where the graphic is displayed is unchanged, so the graphic no longer looks like a supplementary explanation for a specific pattern.

Japanese Patent Application Publication No. 2017-169086 discloses that a monitoring region, which is a part of the region of an input image, is being monitored, and a graphic is deleted in a case where a change of the image is detected in the monitoring region.

However, in the case of the technique disclosed in Japanese Patent Application Publication No. 2017-169086, when scrolling, moving, zooming in/out (enlarging/reducing), or the like is performed within the input image, it may occur that the image in the monitoring region is unchanged, and the graphic is not deleted. Furthermore, when scrolling, moving, zooming in/out, or the like is performed within the input image, most of the input image will continuously be displayed (even through the display position thereof may change). Therefore in the case of the technique disclosed in Japanese Patent Application Publication No. 2017-169086, the graphic may be deleted, although a region with which the graphic is associated is displayed.

SUMMARY OF THE INVENTION

The present invention provides a technique to appropriately update a graphic formed by a pointer, in accordance with the changes of an input image.

A projection apparatus according to the present invention, includes: a projection optical system configured to project an input image onto a projection plane, and at least one memory and at least one processor which function as: a position-detecting unit configured to detect a position pointed to by a pointer on the projection plane; and a control unit configured to perform control so that the projection optical system projects the input image and projects a graphic at the position detected by the position-detecting unit, wherein in a case where an image is scrolled in a specific range of the input image, the control unit performs control so that the graphic corresponding to the specific range moves in a direction in accordance with the scrolling.

Further features of the present invention will become apparent from the following description of exemplary embodiments with reference to the attached drawings.

BRIEF DESCRIPTION OF THE DRAWINGS

FIG. 2 is a schematic diagram depicting a connection between the projection apparatus and an image generation apparatus;

DESCRIPTION OF THE EMBODIMENTS

Embodiment 1

Figure 1:
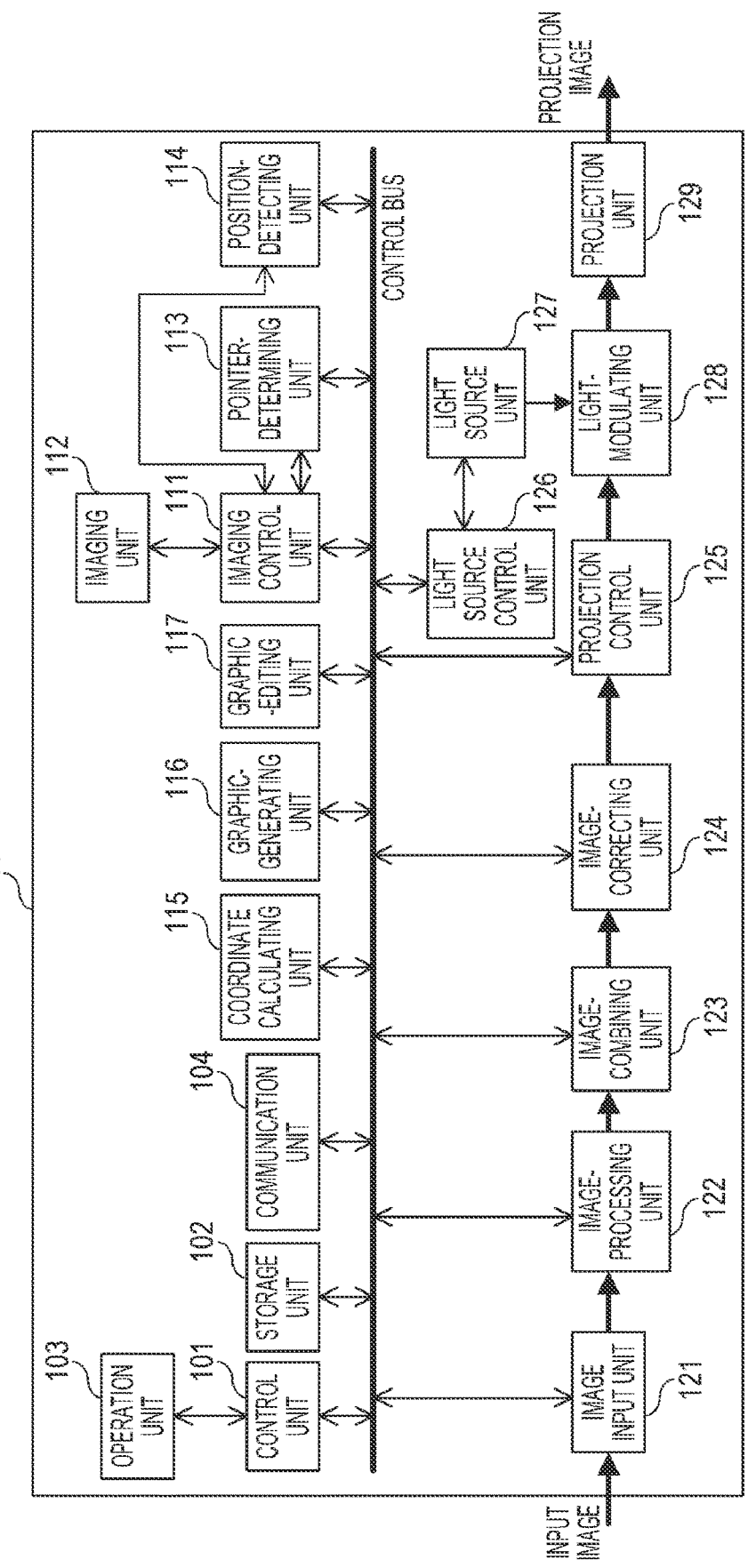
FIG. 1 is a block diagram depicting a configuration example of the projection apparatus.

Embodiment 1 of the present invention will now be described. FIG. 1 is a block diagram depicting a configuration example of a projection apparatus 100 (projector) according to Embodiment 1. In FIG. 1, a thin arrow mark indicates a flow of various data used for control, and a thick arrow mark indicates a flow of image data. In FIG. 1, a control unit 101 is constituted of such arithmetic units as a microcontroller, an application specific integrated circuit (ASIC), and a field-programmable gate array (FPGA). In the same manner, an imaging control unit 111, a pointer-determining unit 113, a position-detecting unit 114, a coordinate calculating unit 115, a graphic-generating unit 116, and a graphic-editing unit 117 are also constituted of such arithmetic units as a microcontroller, ASIC and FPGA. An image-processing unit 122, an image-combining unit 123, an image-correcting unit 124, a projection control unit 125 and a light source control unit 126 are also constituted of such arithmetic units as a microcontroller, ASIC and FPGA. These composing elements are configured as hardware or software in the arithmetic units.

The control unit 101 is connected to each composing element in the projection apparatus 100 via a control bus, and performs various arithmetic processing operations required for controlling each composing element and operating the projection apparatus 100.

A storage unit 102 is a storage device (storage) such as a random access memory (RAM), a solid-state drive (SSD), and a hard disk drive (HDD). The storage unit 102 stores various images and various information required for operating the projection apparatus 100.

An operation unit 103 receives an operation which the user executes using the projection apparatus 100 (user operation). For example, the operation unit 103 includes operation devices (e.g. button(s), mouse) and control circuits thereof. The operation unit 103 transfers the operation performed by the user to the control unit 101, and the control unit 101 controls each composing element of the projection apparatus 100 in accordance with the transferred operation. The operation device may or may not be detachable from the projection apparatus 100. The operation device may be a separate device from the projection apparatus 100, such as a remote controller.

A communication unit 104 is a communication interface that communicates (transmits/receives data) with an external device of the projection apparatus 100. For example, the communication unit 104 includes terminals conforming to the communication standards of a universal serial bus (USB), a local area network (LAN), or the like, and a processing circuit thereof. The communication unit 104 may be capable of performing wireless communication using a wireless LAN or the like.

The imaging control unit 111 controls an imaging unit 112. For example, the imaging control unit 111 switches the imaging unit 112 ON/OFF or instructs the imaging unit 112 to start imaging (imaging instruction).

The imaging unit 112 includes an image pickup element, such as an image sensor or an infrared sensor, and captures an image of a region which includes at least a projection plane (screen). In the projection apparatus 100, when the user points to a position on the projection plane using such a pointer as a digital pen, an input image (image inputted into the projection apparatus 100) is projected onto the projection plane, and at the same time a graphic can be projected at a position that is pointed to by the pointer. The projection apparatus 100 can also edit a graphic at a pointed position in accordance with the pointing instruction by the pointer. In Embodiment 1, for such an operation, the pointer is detected and determined (identified) from the image acquired by imaging (sensor image). In the following description, the term "graphic" refers to a graphic formed by the pointer.

The pointer-determining unit 113 determines (identifies) a pointer from the sensor image acquired by the imaging unit 112. For example, in a case where a light-emitting pattern or a light-emitting wavelength of a pointer is different among a plurality of pointers, the pointer-determining unit 113 detects and determines a pointer from the sensor image based on the information on the differences of the light-emitting patterns, the light-emitting wavelengths, and the like among the pointers. In Embodiment 1, the pointer-determining unit 113 detects a region indicating a light-emitting pattern, a light-emitting wavelength, and the like of the pointer from the sensor image, as the region of this pointer. The pointer-determining unit 113 may determine a pointer at a position detected by the position-detecting unit 114, without performing detection of the pointer. In a case where the shapes of a plurality of pointers are different from each other, the pointer-determining unit 113 may detect and determine a pointer by pattern matching using the shapes of the pointers.

In Embodiment 1, the user controls the pointer to emit light when performing an operation (instruction) using the pointer. Then, as mentioned above, the pointer-determining unit 113 detects a region that indicates a light-emitting pattern, a light-emitting wavelength, and the like of the pointer from the sensor image as the region of this pointer. Therefore in Embodiment 1, when the operation using the pointer is performed on the projection plane, the pointer-determining unit 113 detects and determines the pointer. Therefore the processing of the pointer-determining unit 113 may be regarded as a part of the processing to detect the operation by the pointer. In Embodiment 1, the control unit 101 detects the operation by the pointer using the pointer-determining unit 113, the position-detecting unit 114 and the coordinate calculating unit 115 (the position pointed to by the pointer is detected on the projection plane by the pointer-determining unit 113 and the position-detecting unit 114). The method for detecting the operation by the pointer is not especially limited. For example, the pointer may transmit predetermined information during an operation by the pointer, so that the communication unit 104 receives the predetermined information from the pointer. Then the control unit 101 may determine whether or not an operation by the pointer was performed, depending on whether the communication unit 104 received the predetermined information.

The position-detecting unit 114 detects a position of the pointer from the sensor image acquired by the imaging unit 112. For example, the position-detecting unit 114 detects a region that indicates the light-emitting pattern, the light-emitting wavelength, and the like of the pointer, or performs image analysis, such as pattern matching using the shapes of the pointers, so as to detect the position of the pointer. If a plurality of pointers exist, a position of each of the plurality of pointers is determined. The position-detecting unit 114 may detect a position of the pointer using a method that is different from the image analysis. For example, a sensor (e.g. a pressure sensor, an electrostatic sensor) may be disposed on the projection plane, so that the communication unit 104 acquires an output value of the sensor. Then the position-detecting unit 114 may detect a position of the pointer based on the acquired output value.

The coordinate calculating unit 115 transforms the coordinates of a position, which was detected by the position-detecting unit 114, into a position in the projection image (an image to be projected onto the projection plane, such as an input image). In order to accurately perform this coordinate transformation, the control unit 101 performs calibration of the coordinate transformation. And in order to perform the calibration, the control unit 101 projects a specific projection image, which includes a pattern at a predetermined position, from a projection unit 129 to the projection plane. Then the control unit 101 acquires a sensor image, in a state where the specific projection image is projected (displayed), using the imaging unit 112, and detects the position of the pattern in the sensor image using the position-detecting unit 114. Then the control unit 101 compares the position of the pattern in the sensor image and the position of the pattern in the specific projection image, and corrects the parameters (e.g. transformation matrices) of the coordinate transformation (performs calibration).

The graphic-generating unit 116 generates a graphic in accordance with the operation by the pointer. In Embodiment 1, the graphic-generating unit 116 draws a graphic on a drawing plane based on a position acquired by the coordinate calculating unit 115 (position of the pointer in the projection image). The graphic-generating unit 116 also generates an on screen display (OSD), such as a menu.

The graphic-editing unit 117 edits a graphic (graphic drawn on the drawing plane) in accordance with the operation using the pointer. The editing of a graphic includes at least one of deleting, zooming in/out and moving of the graphic, for example. The zooming in/out may be regarded as a change in the size of the graphic.

An image input unit 121 loads an image (input image; image data) from outside the projection apparatus 100. The image input unit 121 includes an image input circuit conforming to an image communication standard, such as high-definition multimedia interface (HDMI) (registered trademark), DisplayPort (registered trademark), USB or the like.

The image-processing unit 122 performs image-processing (e.g. zooming in/out, color gamut transformation processing, brightness correction processing) on the input image, and outputs the processed image. An image that is outputted from the image-processing unit 122 (processed image) is referred to as an "acquired image". An input image may be used as the acquired image without the image-processing unit 122 performing the image-processing.

The image-combining unit 123 superimposes a drawing plane and an OSD onto the image outputted from the image-processing unit 122, so as to generate a composite image.

The image-correcting unit 124 corrects the composite image in accordance with the states of the projection apparatus 100 and the projection plane, and outputs the corrected image. The image-correcting unit 124 performs: keystone correction processing to correct the image form so that the image looks like a rectangle when projected diagonally, and picture shift processing to correct the projection position, for example.

The projection control unit 125 controls a light-modulating unit 128 based on the image (image data) outputted from the image-correcting unit 124. For example, the projection control unit 125 converts the image data outputted from the image-correcting unit 124 in accordance with the characteristic of a light-modulating element (e.g. liquid crystal element, mirror) included in the light-modulating unit 128, and controls the light-modulating unit 128 in accordance with the converted image data.

The light source control unit 126 controls a light source unit 127. For example, the light source control unit 126 switches the light source unit 127 ON/OFF (light ON/light OFF), or changes the light-emitting brightness (light-emitting intensity; light-emitting quantity) of the light source unit 127.

A light source unit 127 emits light to project an image. The light source unit 127 includes a light source, (e.g. a lamp a light-emitting diode (LED), a laser), and an optical element, (e.g. a lens, a mirror). The light source unit 127 emits light to the light-modulating unit 128. The light source unit 127 may include a plurality of light sources having different emitting light (e.g. three light sources: red light source, green light source, blue light source), or may include one light source (e.g. white light source). The light source unit 127 may include a color wheel to change (switch) a color of light that is emitted from a light source.

The light-modulating unit 128 modulates the light projected from the light source unit 127, so that an image based on the image data outputted from the image-correcting unit 124 is projected onto the projection plane. The method of the light-modulating unit 128 may be any method, such as a liquid crystal display (LCD) method, a liquid crystal on silicon (LCOS) method, and a digital light processing (DLP) (registered trademark) method. The light-modulating unit 128 includes a light-modulating panel (e.g. transmission type liquid crystal panel, reflection type liquid crystal panel, digital mirror deice (DMD)), a lens, a mirror (including a prism), and the like. The light-modulating unit 128 may include a plurality of light-modulating panels corresponding to a plurality of colors (e.g. three colors: red, green and blue), or may include one light-modulating panel.

The projection unit 129 is a projection optical system including the projecting lens, and outputs the light modulated by the light-modulating unit 128 to outside the projection apparatus 100. Thereby the image is projected onto the projection plane. In the case where a graphic is generated by the pointer, this graphic and input image (acquired image) are projected simultaneously (together) onto the projection plane.

FIG. 2 is a schematic diagram depicting a connection between the projection apparatus 100 and an image generation apparatus 200. The image generation apparatus 200 is a personal computer (PC) or the like, and is used to generate an image (input image) to be projected, and to control application software, for example.

A control unit 201 is used to control each composing element constituting the image generation apparatus 200, and also to generate an input image of the projection apparatus 100.

An operation input unit 202 receives the operation performed by the user for the image generation apparatus 200. The operation for the image generation apparatus 200 is performed using such a device as a keyboard and mouse, for example.

A communication unit 203 is a communication interface that communicates with a device outside the image generation apparatus 200 in accordance with such a communication standard as USB and LAN. In Embodiment 1, the communication unit 203 communicates with the communication unit 104 of the projection apparatus 100. By this communication, the projection apparatus 100 can be controlled from the side of the image generation apparatus 200, or the image generation apparatus 200 can be controlled from the side of the projection apparatus 100. Further, such parameters as a size of the input image can be transmitted/received between the image generation apparatus 200 and the projection apparatus 100.

An image output unit 204 outputs an image conforming to such image communication standards as HDMI and DisplayPort. By connecting the image output unit 204 to the image input unit 121 of the projection apparatus 100, the projection apparatus 100 can acquire and project an image generated by the image generation apparatus 200.

Figure 3A:
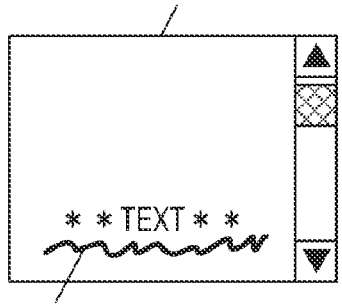
FIGS. 3A to 3C are schematic diagrams depicting examples of the projected image.
Figure 3B:
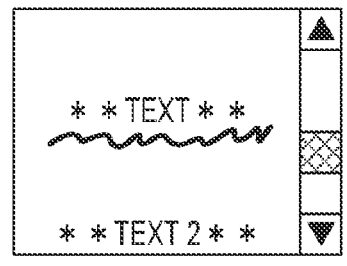
Figure 3C:
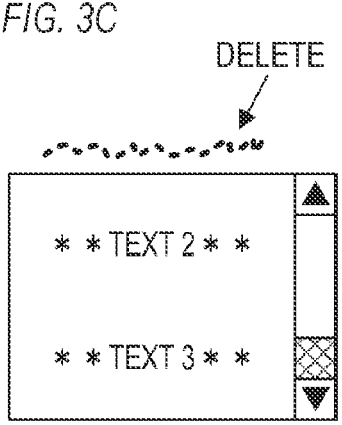

FIGS. 3A to 3C are schematic diagrams depicting examples of the projection image according to Embodiment 1.

In FIG. 3A, a graphic generated by the projection apparatus 100 (a graphic that the user drew using the pointer) is superimposed and displayed on (projected on) an input image generated by the image generation apparatus 200. For example, in a case where the user points to a position on a projection plane using the pointer, and moves the pointer so as to change the pointed position, the imaging unit 112 captures a locus (stroke) of the pointed position. Then the graphic-generating unit 116 generates a graphic representing the locus of the pointed position (a line tracking the locus), and the image-combining unit 123 superimposes the graphic to the input image.

In the prior art, even if the user scrolls inside the input image by operating the image generation apparatus 200, the position of the graphic formed by the pointer does not change, and the graphic is displayed in a way unintended by the user. In Embodiment 1, the position of the graphic is changed (the graphic is moved) in a direction in accordance with the scrolling inside the input image, as illustrated in FIG. 3B. Thereby the graphic can be displayed continuously as intended by the user.

Further, in Embodiment 1, if the graphic moves outside the range of the input image as a result of changing the position of the graphic in accordance with the scrolling within the input image, as illustrated in FIG. 3C, the graphic is deleted from the projection plane (graphic is hidden). Thereby the graphic can be hidden as intended by the user.

Even if the graphic is hidden, the position of the graphic is constantly managed and changed in accordance with the scrolling inside the input image. The graphic and the position of the graphic are associated and stored in the storage unit 102. Then in the case where the position of the graphic (graphic deleted from the projection plane) is changed in accordance with the scrolling inside the input image, and this graphic moves back into the range of the input image, the display of the graphic is restored. Specifically, the graphic can be read from the storage unit 102 and be displayed (projected) again. Thereby the display and non-display of the graphic can be switched as intended by the user.

Figure 4:
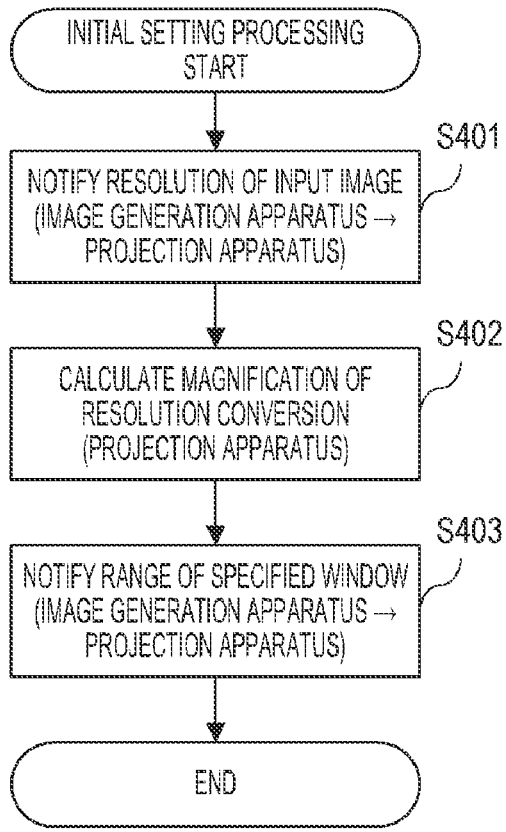
FIG. 4 is a flow chart depicting an example of initial setting processing.

FIG. 4 is a flow chart depicting an example of the initial setting processing according to Embodiment 1. For example, the processing in FIG. 4 starts when the communication unit 104 of the projection apparatus 100 and the communication unit 203 of the image generation apparatus 200 are interconnected.

In step S401, the control unit 201 of the image generation apparatus 200 notifies information on the resolution of the input image (resolution information) generated in the image generation apparatus 200 to the projection apparatus 100. The resolution information is notified from the communication unit 203 of the image generation apparatus 200 to the communication unit 104 of the projection apparatus 100. The control unit 201 may attach metadata of the resolution information to the input image, and the image input unit 121 may extract the metadata of the resolution information from the input image. The image input unit 121 may measure (count) a number of pixels (resolution) of the input image.

In step S402, the control unit 101 of the projection apparatus 100 calculates the magnification for the resolution conversion performed by the image-processing unit 122, based on the resolution information (resolution of the input image) notified in step S401. For example, the resolution conversion is a processing to match the resolution of the input image with the resolution of the light-modulating unit 128 (light-modulating panel). Here it is assumed that the resolution (a number of pixels in the horizontal direction×a number of pixels in the vertical direction) of the input image is 1920×1080, and the resolution of the light-modulating unit 128 is 3840×2160. In this case, ×2 (=3840/1920=2160/1080) is calculated as the magnification for the resolution conversion. As a result, one pixel of the input image becomes equivalent to two pixels of the light-modulating unit 128, and a movement of one pixel in the input image becomes equivalent to movement of two pixels in the light-modulating unit 128. In this way, in step S402, a magnification, that indicates a number of pixels of movement in the light-modulating unit 128 (projection image) to which one pixel of movement in the input image is equivalent, is determined.

In a case where an aspect ratio of the input image is different from an aspect ratio of the light-modulating unit 128, for example, magnifications that are different between the horizontal direction and the vertical direction may be determined. Further, in a case where such transformations as digital zooming, keystone correction and warping are performed by the image-correcting unit 124, it is preferable to determine a magnification considering such transformations.

In step S403, the control unit 201 of the image generation apparatus 200 determines at least partial range of the input image as a specific image in which a graphic is drawn using the pointer. In Embodiment 1, the user operates the image generation apparatus 200 and specifies a specific application (application window). Then the control unit 201 determines a range of the specified application window (window) as the specific range. In other words, the control unit 201 determines a range corresponding to a specific window included in the input image as the specific range. The control unit 201 notifies the information on the specific range (e.g. coordinates of four corners of the specific range) to the projection apparatus 100. The information on the specific range is notified from the communication unit 203 of the image generation apparatus 200 to the communication unit 104 of the projection apparatus 100. The method for determining the specific range is not especially limited, and the specific range need not be the range of the window.

The projection apparatus 100 draws a graphic inside the specific range using the pointer. In a case where the image is scrolled inside the specific range, the projection apparatus 100 changes the position of the graphic in accordance with the scrolling (so as to track with the scrolling). Then the projection apparatus 100 deletes the graphic if the graphics moves out of the specific range, and draws a graphic again if the graphic moves back into the specific range. Therefore on the projection plane, the graphic formed by the pointer is not projected onto a portion corresponding to a region outside the specific range, and is projected onto a portion corresponding to a region inside the specific range.

Figure 5:
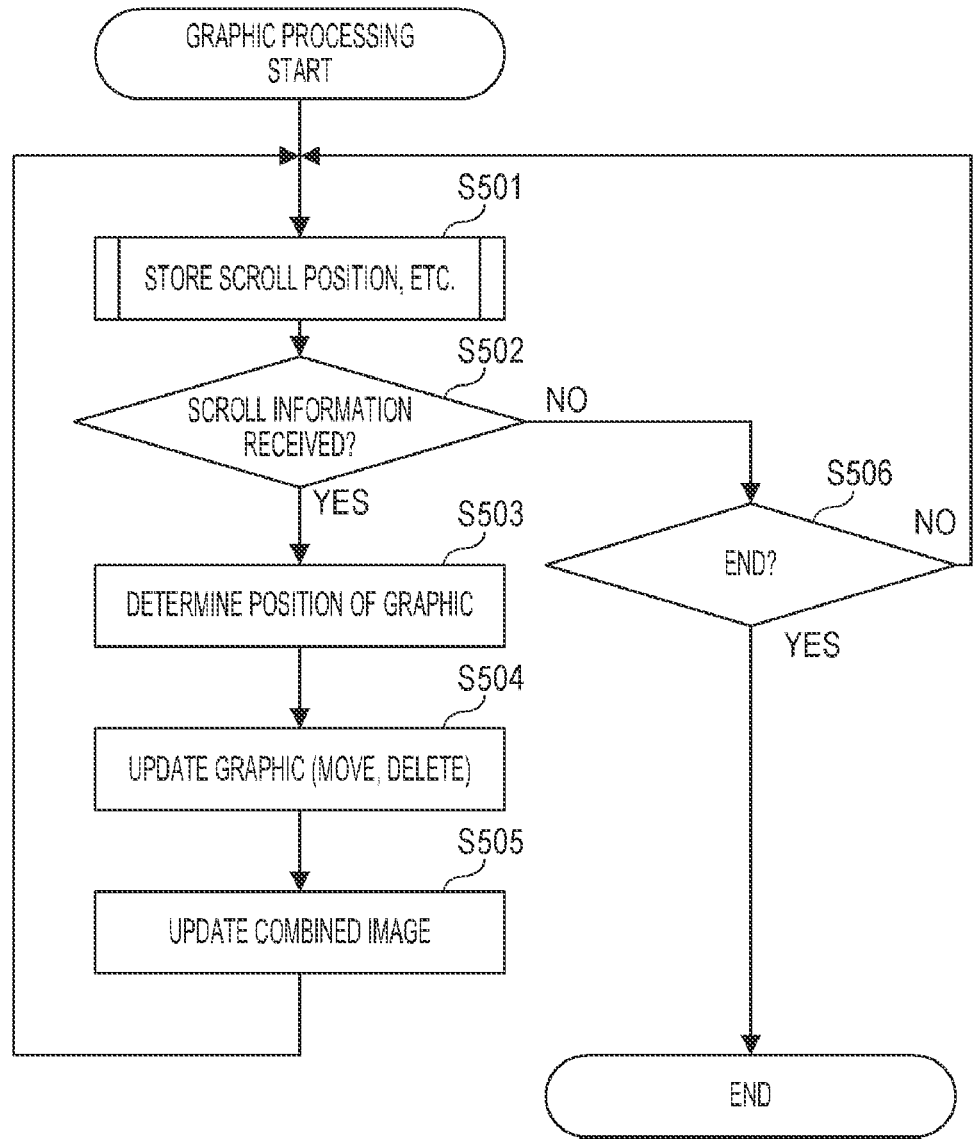
FIG. 5 is a flow chart depicting an example of graphic processing.

FIG. 5 is a flow chart depicting an example of the graphic processing according to Embodiment 1. For example, the processing in FIG. 5 starts when the initial setting processing in FIG. 4 completes, and the projection apparatus 100 projects the input image onto the projection plane.

In a case where a graphic was generated using the pointer, the control unit 101 of the projection apparatus 100 associates this graphic, the position of this graphic, and the scroll position of a specified window (specific range) with each other, and stores this information in the storage unit 102 in step S501. In a case where the position of the graphic is changed, the control unit 101 stores the position of this graphic and the scroll position of the specified window in the storage unit 102 (update of the information stored in the storage unit 102). The scroll position is notified from the control unit 201 of the image generation apparatus 200 to the control unit 101 of the projection apparatus 100 via the communication unit 203 of the image generation apparatus 200 and the communication unit 104 of the projection apparatus 100. In Embodiment 1, a part of the image is displayed in the specified window. The scroll position refers to a position of a portion of the image displayed in the specified window.

In step S502, the control unit 101 of the projection apparatus 100 determines whether the scroll information was received from the image generation apparatus 200. In a case where the user scrolled inside the specified window by operating the image generation apparatus 200, the control unit 201 of the image generation apparatus 200 notifies the scroll information on this scrolling to the projection apparatus 100. The scroll information is notified from the control unit 201 of the image generation apparatus 200 to the control unit 101 of the projection apparatus 100 via the communication unit 203 of the image generation apparatus 200 and the communication unit 104 of the projection apparatus 100. The control unit 101 of the projection apparatus 100 advances processing to step S503 if it is determined that the scroll information was received, that is, if scrolling is performed inside the specified window. The control unit 101 of the projection apparatus 100 advances the processing to step S506 if it is determined that the scroll information was not received, that is, if scrolling was not performed inside the specified window.

The scroll information includes a number of pixels of scrolling (a number of scroll pixels: moving amount) and a direction of scrolling (scroll direction), for example. Specifically, in a case where the user moves a knob of the scroll bar downward to scroll inside the specified window upward by 10 pixels, the control unit 201 of the image generation apparatus 200 notifies the scroll information indicating 10 pixels and the upward direction to the projection apparatus 100. The knob of the scroll bar is an indicator to indicate a scroll position. The scroll information may not include a number of scroll pixels and a scroll direction, and may include other information. For example, the scroll information may include a scroll position. In this case, information on a number of scroll pixels and a scroll direction can be acquired from the scroll position included in the scroll information (scroll position notified at this time) and the scroll position stored in the storage unit 102 (scroll position notified a previous time).

In step S503, the control unit 101 of the projection apparatus 100 determines a new position of the graphic based on the notified scroll information. For example, the control unit 101 calculates the moving distance of the graphic by multiplying the number of scroll pixels by the magnification determined in step S402 in FIG. 4. Then, using the coordinate calculating unit 115, the control unit 101 determines a position, which is moved from the position of the graphic stored in the storage unit 102, by the calculated moving distance in the scroll direction, as a new position of the graphic. Specifically, in the case where a number of scroll pixels is 10, the scroll direction is upward, and the magnification is ×2, the control unit 101 determines a new position of the graphic so that the position of the graphic changes in the upward direction by 20 pixels. In the case where a plurality of graphics formed by the pointer exist, the control unit 101 determines a new position for each of the entire plurality of graphics.

In step S504, the control unit 101 updates a drawing plane based on the position determined in step S503. Specifically, using the graphic-editing unit 117, the control unit 101 deletes the graphic, of which position calculated in step S503 is outside the specified window, from the drawing plane. Further, using the graphic-editing unit 117, the control unit 101 redraws the graphic, of which position calculated in step S503 is inside the specified window, at a position calculated in step S503 on the drawing plane. The graphic deleted from the drawing plane is continuously stored in the storage unit 102, and the position of this graphic is also continuously managed. Therefore if the graphic that was moved out of the specified window and deleted returns to a position inside the specified window, the graphic is read from the storage unit 102 and drawn on the drawing plane.

In step S505, the control unit 101 combines the updated drawing plane with the input image using the image-combining unit 123 (update of the combined image).

In step S506, the control unit 101 determines whether display of the graphic is ended. In the case where it is determined to end the display of the graphic, the control unit 101 hides all the graphics formed by the pointer, and ends the graphic processing. In the case where it is determined that the display of the graphic is not ended, the control unit 101 returns the processing back to step S501. The control unit 101 determines that the display of the graphic when the user performs an end operation to end display of the graphic is ended, or when the user performs a power OFF operation to turn the power of the projection apparatus 100 OFF, for example.

As described above, according to Embodiment 1, the graphic formed by the pointer can be appropriately updated in accordance with the change of the input image (so as to match the graphic formed by the pointer with the change of the input image). Specifically, in accordance with the scrolling inside the input image, the graphic formed by the pointer can be moved (position of the graphic can be changed), deleted or restored.

The image generation apparatus 200 may notify the scroll information at a predetermined cycle, and the projection apparatus 100 may change the position of the graphic each time the scroll information is received. In this case, the position of the graphic changes at a predetermined cycle. If the predetermined cycle is set to be short, it can be displayed as if the graphic were tracking the scrolling inside the input image in real-time.

The projection apparatus 100 may change the position of the graphic at a timing when the scrolling ends, without changing the position of the graphic during scrolling inside the input image. For example, the image generation apparatus 200 may notify the scroll information in a period from pressing to releasing the mouse button (of the operation input unit 202) all at once, and the projection apparatus 100 may change the position of the graphic in accordance with the notified scroll information. Then the processing load required for communication and the like can be reduced.

The projection apparatus 100 may change the position of the graphic at a timing when pointing by the pointer ends, without changing the position of the graphic while pointing by the pointer continues (while the user is drawing), even if scrolling is performed inside the input image. The position of the graphic may be changed all at once or in steps. The timing to record the graphic in the storage unit 102 is not especially limited, and may be a timing when the pointing by the pointer ends, that is, a timing when the user has finished writing one stroke using the pointer, for example.

The projection apparatus 100 may hide all the graphics (deletes all the graphics from the projection plane) in a case where the contents displayed in the specified window (in a specific range) are changed (switched to different contents), or in a case where the scene of the contents is switched. For example, when the contents are changed or a scene is switched, the image generation apparatus 200 may notify this change from the communication unit 203 to the communication unit 104, and the projection apparatus 100 may hide all the graphics based on the notification from the image generation apparatus 200. Instead of notifying the change of the contents or switching the scene, the image generation apparatus 200 may instruct the projection apparatus 100 to hide all the graphics.

The projection apparatus 100 may hide all the graphics in the case where a mouse-controlled cursor or the like is positioned on the specified window, or in a case where another window is placed on top of the specified window. For example, in a case where the display position of the specified window is no longer at the front, the image generation apparatus 200 may notify this state from the communication unit 203 to the communication unit 104, and the projection apparatus 100 may hide all the graphics based on the notification from the image generation apparatus 200. Instead of notifying that the display position of the specified window is no longer at the front, the image generation apparatus 200 may instruct the projection apparatus 100 to hide all the graphics.

Embodiment 2

Embodiment 2 of the present invention will now be described. In the following, an aspect (e.g. configuration, processing) that is different from Embodiment 1 will be described in detail, and redundant description on aspects the same as Embodiment 1 will be omitted.

In Embodiment 1, an example where the projection apparatus 100 updates a graphic in cooperation with the image generation apparatus 200 was described. Specifically, an example where the projection apparatus 100 moves, deletes or restores the graphic based on the scroll information received from the image generation apparatus 200, was described. In Embodiment 2, an example where the projection apparatus independently analyzes an input image and updates the graphic based on the analyzed result will be described. In Embodiment 2, the initial setting processing of Embodiment 1 (FIG. 4) is unnecessary.

Figure 6:
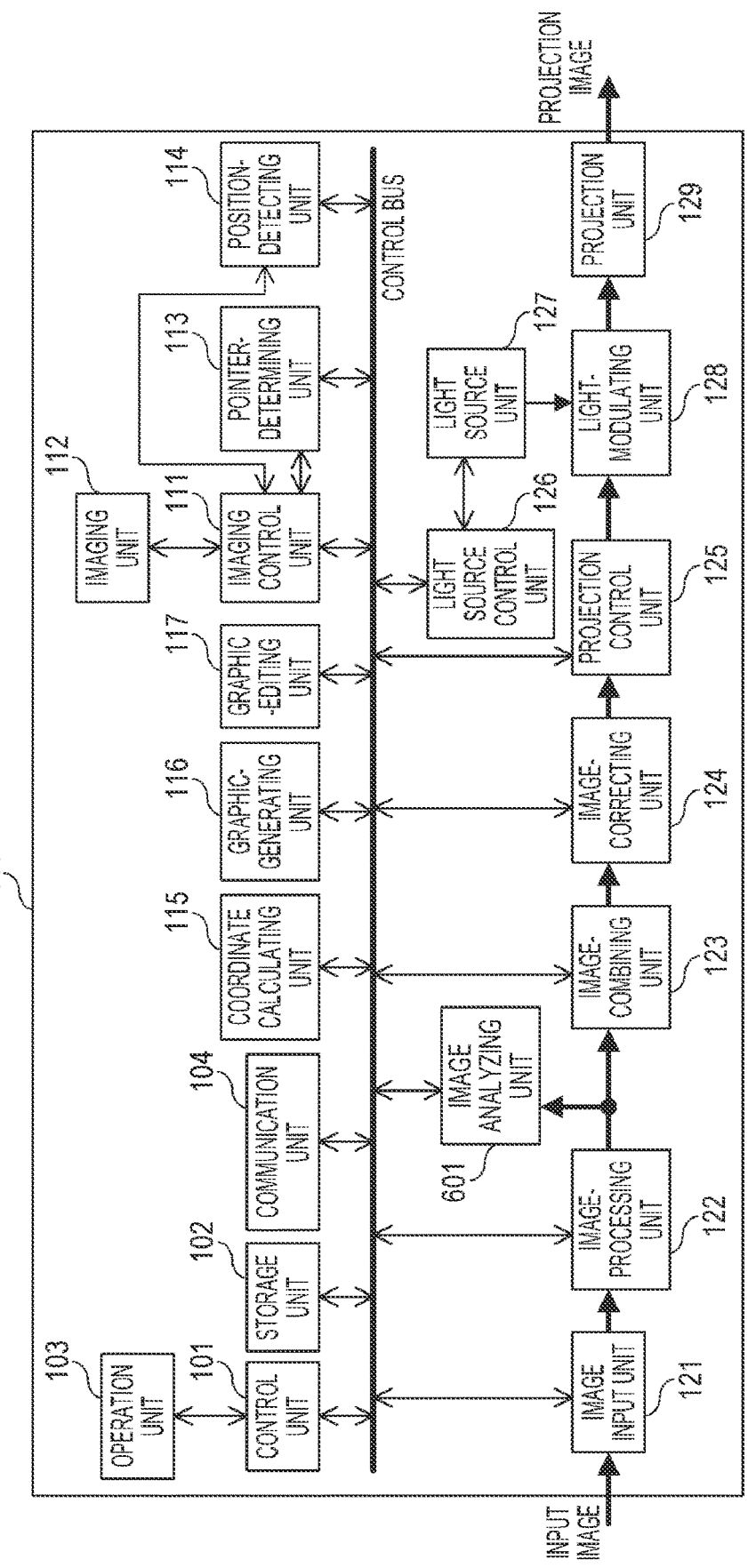
FIG. 6 is a block diagram depicting a configuration example of the projection apparatus.

FIG. 6 is a block diagram depicting a configuration example of a projection apparatus 600 according to Embodiment 2. In FIG. 6, a composing element the same as Embodiment 1 (FIG. 1) is denoted with a same reference sign as Embodiment 1.

An image analyzing unit 601 detects scrolling inside the input image by analyzing the input image. Specifically, the image analyzing unit 601 detects a motion vector of the image. The magnitude of the motion vector can be used as a moving amount of the scroll, and the direction of the motion vector can be used as a direction of the scroll. The method for detecting the motion vector is not especially limited. For example, the image analyzing unit 601 may detect edges from the input image, and calculate the motion vector based on the difference between the frames at the edges. Instead of the edges of the input image, other characteristic values, such as the brightness distribution of the input image, may be used. The image analyzing unit 601 may acquire the characteristic values (without detecting the motion vector), and the control unit 101 may detect the motion vector based on the acquired characteristic value.

Figure 7:
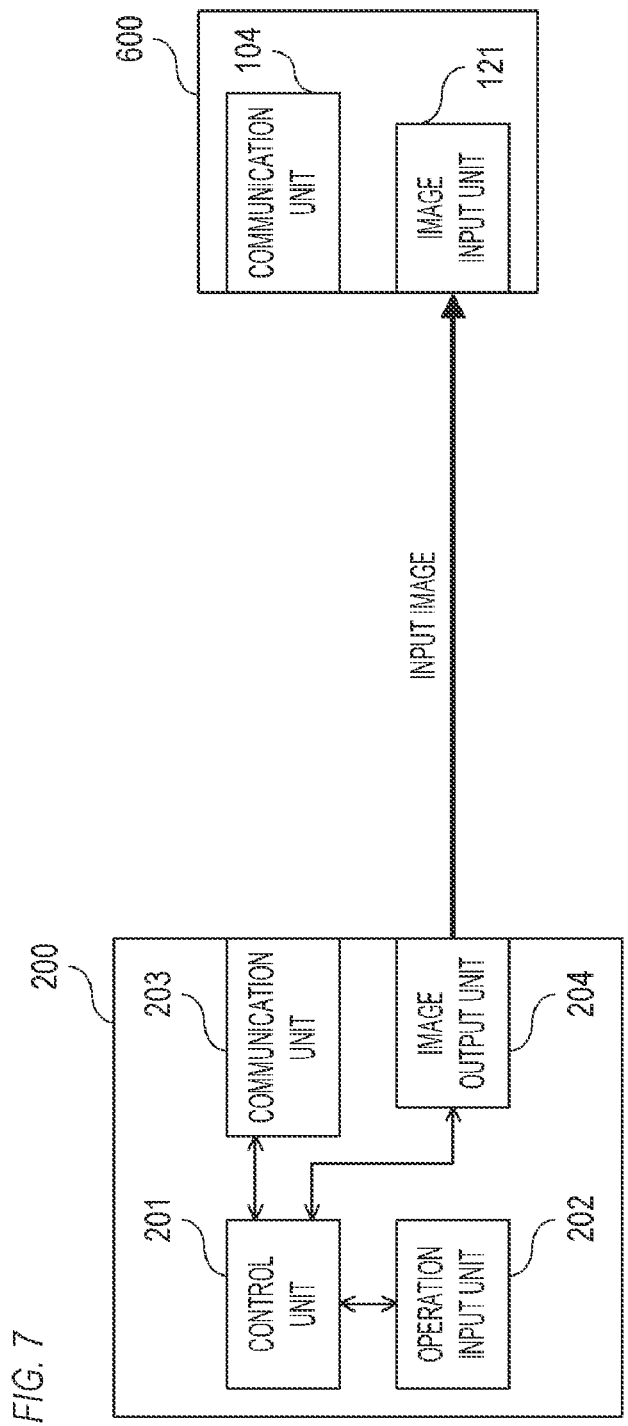
FIG. 7 is a schematic diagram depicting a connection between the projection apparatus and the image generation apparatus.

FIG. 7 is a schematic diagram depicting a connection between the projection apparatus 600 and the image generation apparatus 200. But unlike Embodiment 1 (FIG. 2), the communication unit 104 and the communication unit 203 are not connected. In other words, the projection apparatus 600 cannot receive the scroll information from the image generation apparatus 200. As described above, the projection apparatus 600 detects scrolling based on the input image acquired by the image input unit 121.

The projection image according to Embodiment 2 is the same as Embodiment 1 (FIGS. 3A to 3C). The range of the specified window (specific range) may be automatically detected by the image analyzing unit 601 analyzing the input image, or may be specified by the user operating the projection apparatus 100. For example, the image analyzing unit 601 detects the frames of windows in the input image, and automatically detects the window displayed at the front or the largest window as the specified window. If it is difficult to automatically detect the specified window (e.g. a case where many windows are displayed), therefore the projecting apparatus 600 may prompt the user to determine which window is the specified window, so that the user can specify the window. The method for the user to specify the window is not especially limited, and, for example, the user may specify two points and the control unit 101 may regard a rectangular range, where the specified two points are apexes at opposite angles, as the range of the specified window.

Figure 8:
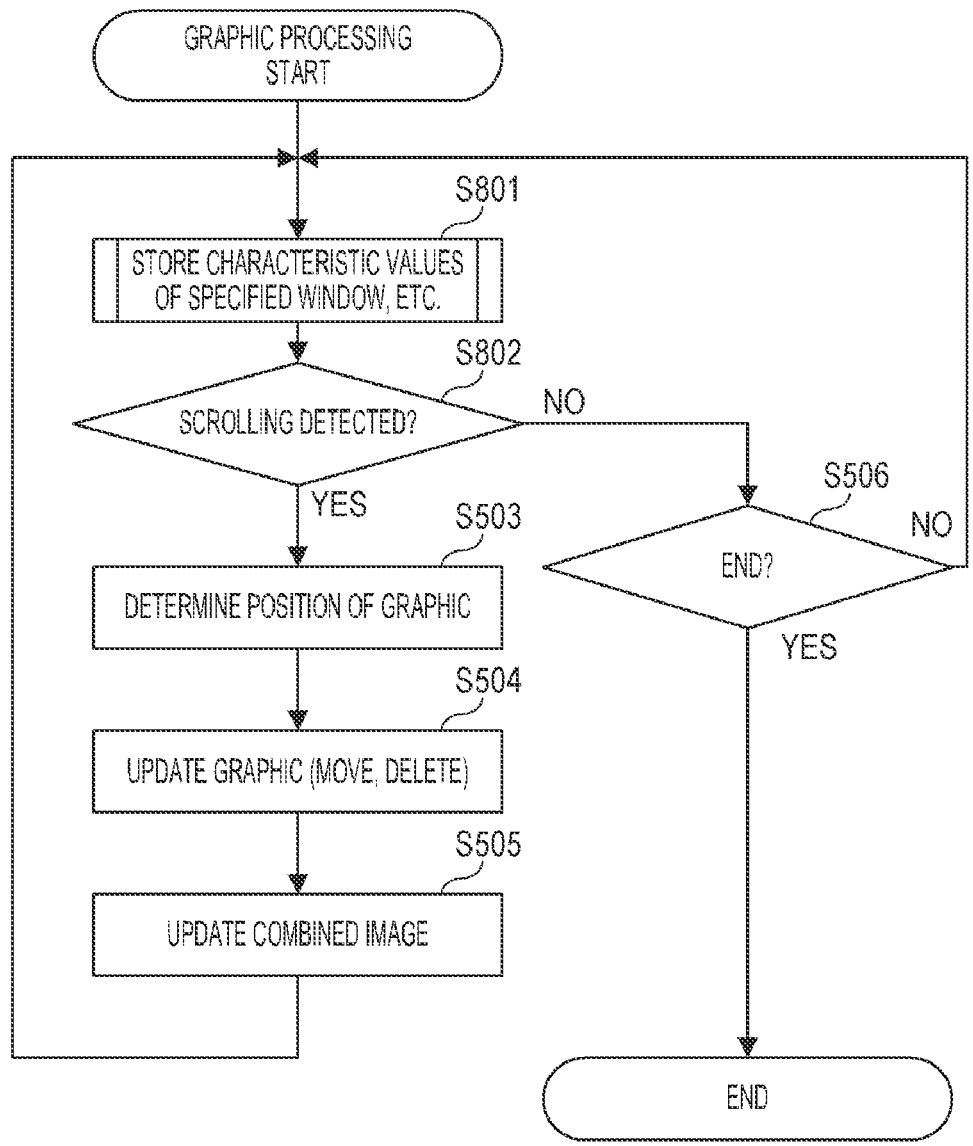
FIG. 8 is a flow chart depicting an example of the graphic processing.

FIG. 8 is a flow chart depicting an example of the graphic processing according to Embodiment 2. For example, the processing in FIG. 8 starts when the projection apparatus 600 projects the input image onto the projection plane.

In the case where the graphic was generated using the pointer, the control unit 101 of the projection apparatus 600 associates this graphic, the position of this graphic, and the characteristic values of the image inside the specified window with each other, and stores this information in the storage unit 102 in step S801. In a case where the position of the graphic is changed, the control unit 101 stores the position of this graphic and the characteristic values of the image inside the specified window in the storage unit 102 (update the information stored in the storage unit 102). The characteristic values of the image inside the specified window are acquired from the input image by the image analyzing unit 601.

In step S802, the control unit 101 determines whether scrolling was performed inside the specified window. Specifically, the control unit 101 acquires the characteristic values (current characteristic values) of the image inside the specified window using the image analyzing unit 601. The control unit 101 also reads the characteristic values (previous characteristic values) stored in the storage unit 102 from the storage unit 102. Then the control unit 101 compares the current characteristic values and the previous characteristic values, and detects a motion vector of the image inside the specified window. In a case where the magnitude of the motion vector is larger than 0, the control unit 101 determines that scrolling was performed, and advances processing to step S503. In a case where the magnitude of the motion vector is 0, the control unit 101 determines that scrolling was not performed, and advances processing to step S506. As mentioned above, the image analyzing unit 601 may or may not be used to detect the motion vector. A threshold larger than 0 may be set, so that it is determined that scrolling was performed if the magnitude of the motion vector is larger than the threshold, and it is determined that scrolling was not performed if the magnitude of the motion vector is the threshold or less.

The processing steps S503 to S506 are the same as Embodiment 1 (FIG. 5). In step S503, the magnitude of the motion vector (a number of moved pixels) detected in step S802 is used as a number of scroll pixels, and the direction of the motion vector is used as the scroll direction.

As described above, according to Embodiment 2, the projection apparatus independently analyzes the input image and updates the graphic based on the analyzed result, whereby a similar effect as Embodiment 1 can be acquired.

The image analyzing unit 601 may detect a knob (indicator to indicate the scroll position) of the scroll bar of the specified window, and detect scrolling inside the specified window based on the position of the knob. In other words, the position of the knob may be used instead of the above mentioned characteristic values. Further, the image analyzing unit 601 determines that the contents are changed or the scene is switched if scrolling, of which moving amount is larger than a threshold, is detected, and notifies this change to the control unit 101. Then the control unit 101 may hide all the graphics in accordance with the notification on the change of the contents or on the switching of the scene.

Embodiment 3

Embodiment 3 of the present invention will now be described. In the following, an aspect (e.g. configuration, processing) that is different from Embodiment 1 will be described in detail, and redundant description on aspects the same as Embodiment 1 will be omitted.

In Embodiment 1, an example where the position of the graphic is changed in accordance with scrolling inside the specified window was described. In Embodiment 3, an example where the graphic is updated in accordance with such changes as moving and zooming in/out of the specified window will be described. When such as change as moving and zooming in/out of the specified window occurs, at least one of the position and the size of the specified window changes. Further, in the case of zooming in/out of the specified window, an image displayed inside the specified window is also zoomed in/out in accordance with zooming in/out of the specified window. In the case of moving of the specified window alone, the image displayed inside the specified window is unchanged. Therefore in Embodiment 3, at least one of the position and the size of the graphic is changed in accordance with such changes as the moving and zooming in/out of the specified window.

The configuration of a projection apparatus according to Embodiment 3 is the same as embodiment 1 (FIG. 1). Therefore the projection apparatus according to Embodiment 3 and composing elements thereof are denoted with same reference signs as Embodiment 1 (FIG. 1). The connection between the projection apparatus 100 according to Embodiment 3 and the image generation apparatus 200 is also the same as Embodiment 1 (FIG. 2). The initial setting processing according to Embodiment 3 is also the same as Embodiment 1 (FIG. 4).

Figure 9A:
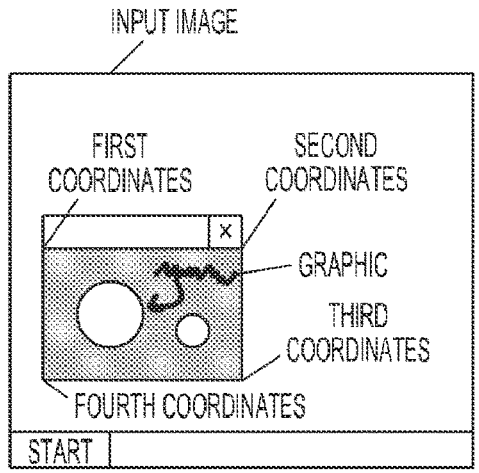
FIGS. 9A and 9B are diagrams depicting a state of display in the case of moving and zooming in/output of the window.
Figure 9B:
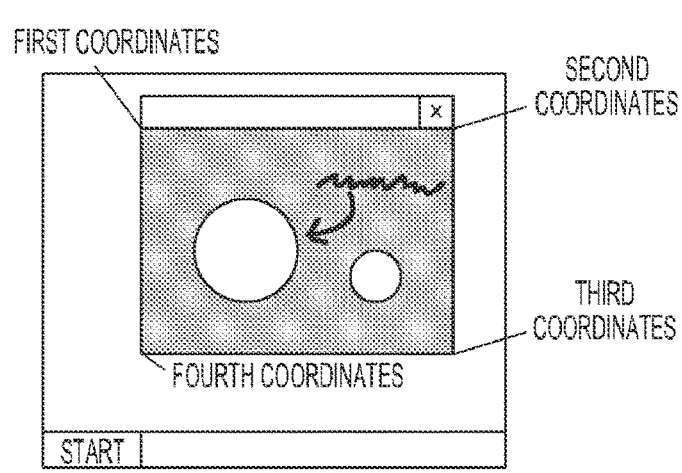

FIGS. 9A and 9B are schematic diagrams depicting examples of the projection image according to Embodiment 3. In FIG. 9A, a graphic generated by the projection apparatus 100 (a graphic that the user drew using the pointer) is superimposed and displayed (projected) on the input image generated by the image generation apparatus 200. As described in Embodiment 1, in the prior art, even if the user scrolls inside the input image by operating the image generation apparatus 200, the position of the graphic formed by the pointer does not change, and the graphic is displayed in a way unintended by the user. In Embodiment 3, at least one of the position and the size of the graphic is changed in accordance with such changes as moving and zooming in/out of the specified window, as illustrated in FIG. 9B. Thereby the graphic can be continuously displayed as intended by the user.

Figure 10:
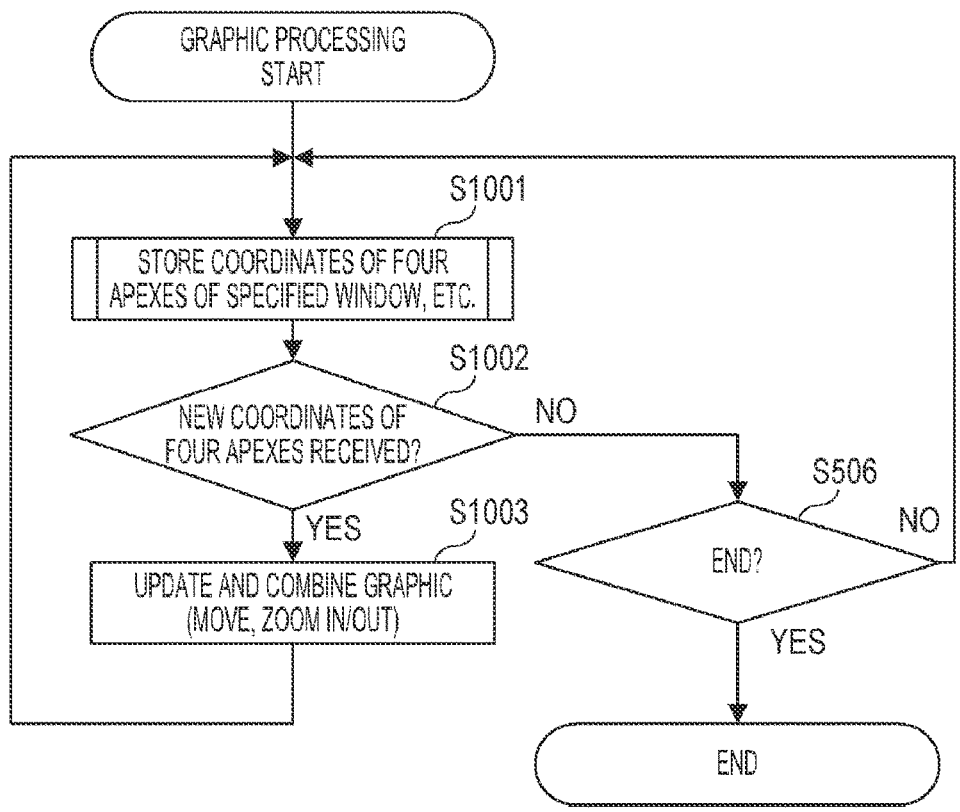
FIG. 10 is a flow chart depicting an example of the graphic processing.
Figure 11A:
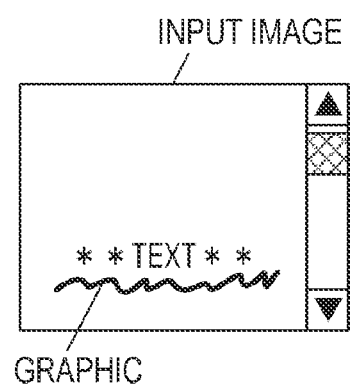
FIGS. 11A and 11B are schematic diagrams depicting an example of conventional projection images.
Figure 11B:
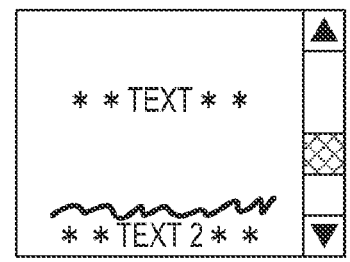
Figure 12A:
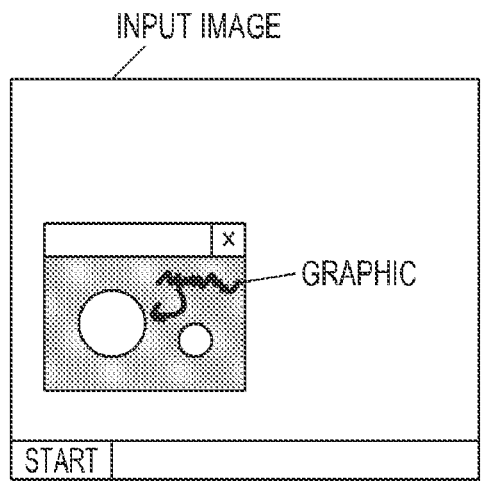
FIGS. 12A and 12B are schematic diagrams depicting an example of conventional projected images.
Figure 12B:
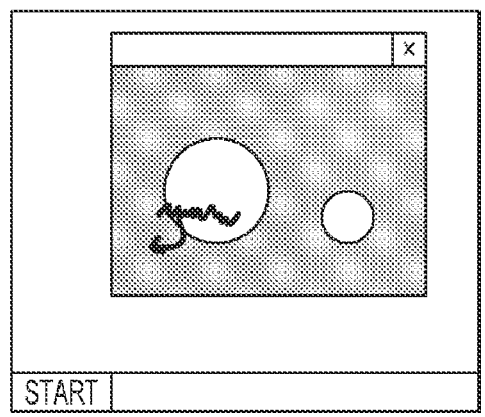

FIG. 10 is a flow chart depicting an example of the graphic processing according to Embodiment 3. For example, the processing in FIG. 10 starts when the initial setting processing in FIG. 4 completes, and the projection apparatus 100 projects the input image onto the projection plane.

In a case where a graphic was generated using the pointer, the control unit 101 of the projection apparatus 100 associates this graphic, the position of this graphic, and the coordinates of the four apexes of the specified window (specified range) with each other, and stores this information in the storage unit 102 in step S1001. In a case where the position of the graphic is changed, the control unit 101 stores the position of this graphic and the coordinates of the four apexes of the specified window in the storage unit 102 (update of the information stored in the storage unit 102). The coordinates of the four apexes are, for example, the first coordinates, the second coordinates, the third coordinates and the fourth coordinates illustrated in FIGS. 9A and 9B. The coordinates of the four apexes are notified from the control unit 201 of the image generation apparatus 200 to the control unit 101 of the projection apparatus 100 via the communication unit 203 of the image generation apparatus 200 and the communication unit 104 of the projection apparatus 100.

In step S1002, the control unit 101 of the projection apparatus 100 determines whether the new coordinates of the four apexes of the specified window were received from the image generation apparatus 200. In a case where the user moved or zoomed in/out of the specified window by operating the image generation apparatus 200, the control unit 201 of the image generation apparatus 200 notifies the new coordinates of the four apexes of the specified window to the projection apparatus 100. The control unit 101 of the projection apparatus 100 advances processing to step S1003 if it is determined that the new coordinates of the four apexes were received, that is, if the specified window was moved or zoomed in/out. The control unit 101 of the projection apparatus 100 advances processing to step S506 if it is determined that the new coordinates of the four apexes were not received, that is, if the specified window was not moved or zoomed in/out. The processing in step S506 is the same as Embodiment 1 (FIG. 5).

In step S1003, the control unit 101 of the projection apparatus 100 updates the graphic based on the coordinates of the four apexes acquired in step S1002 and the coordinates of the four apexes stored in the storage unit 102. For example, the control unit 101 updates the drawing plane using the graphic-editing unit 117, and combines the updated drawing plane with the input image using the image-combining unit 123.

A concrete example of the processing in step S1003 will be described. Here it is assumed that the coordinates (0, 0) at the upper left corner, out of the coordinate (horizontal position, vertical position) of the input image, are regarded as the coordinates of the origin, and the value of the horizontal position increases in the right direction, and the value of the vertical position increases in the downward direction.

It is assumed that the coordinates of the four apexes before moving and zooming in/out of the specified window (coordinates of the four apexes stored in the storage unit 102) are as follows.

First coordinates (X01, Y01)
Second coordinates (X02, Y02)
Third coordinates (X03, Y03)
Fourth coordinates (X04, Y04)

It is assumed that the coordinates of the four apexes after moving or zooming in/out of the specified window (coordinates of the four apexes acquired in step S1002) are as follows.

First coordinates (X11, Y11)
Second coordinates (X12, Y12)
Third coordinates (X13, Y13)
Fourth coordinates (X14, Y14)

Using the following expressions, the control unit 101 calculates a degree Zx of zoom in/out in the horizontal direction (magnification in the horizontal direction) and the degree Zy of zoom in/out in the vertical direction (magnification in the vertical direction).

$$Zx=(X12-X11)/(X02-X01)$$

$$Zy=(Y13-Y12)/(Y03-Y02)$$

The graphic-editing unit 117 performs moving or zooming in/out of the graphic (update of the drawing plane) based on the magnifications Zx and Zy. Specifically, the graphic-editing unit 117 moves each pixel of the graphic (changes coordinates of each pixel of the graphic) using the following expressions. In the following expressions, the coordinates (X0, Y0) are the coordinates before moving, and the coordinates (X1, Y1) are the coordinates after moving. In some cases, the coordinates after moving may not be pixel coordinates (coordinates at which a pixel can be generated), and pixel coordinates to which a pixel of the graphic is not moved may exist between the coordinates after moving. For such pixel coordinates, the graphic-editing unit 117 generates a pixel (determines the pixel value) by interpolation or the like using the pixels of the graphic existing in the periphery of the missing pixel.

$$X1=(X0-X01)\times Zx+X11$$

$$Y1=(Y0-Y01)\times Zy+Y11$$

Then the image-combining unit 123 combines the updated drawing plane with the input image. By this method, the graphic can be moved or zoomed in/out in accordance with the moving or zooming in/out of the specified window.

As described above, according to Embodiment 3, the graphic can be moved or zoomed in/out in accordance with the moving or zooming in/out of the specified window (specific range) (so as to match with the moving or zooming in/out of the specified window).

An example where the projection apparatus has the same configuration as Embodiment 1 and communicates with the image generation apparatus 200 was described, but the projection apparatus may have the same configuration as Embodiment 2. In this case, the projection apparatus may detect the coordinates of the four apexes of the specified window by analyzing the input image without communicating with the image generation apparatus 200, and may detect the change of the coordinates of the four apexes (change indicating the threshold or more) as the moving or zooming in/out of the specified window. In other words, the coordinates of the four apexes may be used instead of the characteristic values in Embodiment 2. If the moving or zooming in/out of the specified window is detected, the moving or zooming in/out of the graphic may be performed based on the change of the coordinates of the four apexes in the same manner as the processing described above.

The above mentioned embodiments (including modifications) are merely examples, and configurations implemented by appropriately modifying or changing the above mentioned configurations within the scope of the spirit of the present invention are also included in the present invention. Further, configurations implemented by appropriately combining the above mentioned configurations are also included in the present invention. For example, a case of using the two pointers was described, but three or more pointers may be used.

According to the present disclosure, a graphic formed by a pointer can be appropriately updated in accordance with the change of the input image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-007252, filed on Jan. 20, 2021, which is hereby incorporated by reference herein in its entirety.

What is claimed is:
1. A projection apparatus comprising:
a projection optical system configured to project an input image onto a projection plane, and
a position detector configured to detect a position pointed to by a pointer on the projection plane; and
a controller configured to perform control so that the projection optical system projects the input image and projects a graphic at the position detected by the position detector, wherein
in a case where an image is scrolled in a specific range of the input image, the controller performs control so that the graphic corresponding to the specific range moves in a direction in accordance with the scrolling, and
the specific range is a range corresponding to a specific window included in the input image.

2. The projection apparatus according to claim 1, further comprising a communication interface configured to receive, from an external apparatus, information on scrolling of the image in the specific range, wherein
the controller controls a position of the graphic, based on the information.

3. The projection apparatus according to claim 1,
further comprising a scroll detector configured to analyze the input image and detect scrolling of the image in the specific range, wherein
the controller controls a position of the graphic, based on a result of the detection by the scroll detector.

4. The projection apparatus according to claim 3, wherein
the scroll detector detects an indicator, which indicates a scroll position of the image in the specific range, from the input image, and detects scrolling of the image in the specific range, based on the position of the indicator.

5. The projection apparatus according to claim 1, wherein
in a case where the graphic moves out of the specific range as a result of moving the graphic in accordance with the scrolling of the image in the specific range, the controller performs control so that the graphic is deleted from the projection plane.

6. The projection apparatus according to claim 5, further comprising a storage configured to store the graphic, wherein
in a case where the graphic deleted from the projection plane moves into the specific range as a result of moving the graphic in accordance with the scrolling of the image in the specific range, the controller performs control so that the graphic is projected again.

7. The projection apparatus according to claim 1, wherein
the controller performs control so that the graphic moves in a predetermined cycle during scrolling the image in the specific range.

8. The projection apparatus according to claim 1, wherein
the controller performs control so that the graphic does not move while scrolling of an image in the specific range is performed, and the graphic moves at timing when the scrolling of the image in the specific range ends.

9. The projection apparatus according to claim 1, wherein
the controller performs control so that the graphic does not move while pointing by the pointer is continuing, and the graphic moves at a timing when the pointing ends.

10. A control method for a projection apparatus, comprising:
performing control so that an input image is projected onto a projection plane;
detecting a position pointed to by a pointer on the projection plane;
performing control so that the input image is projected and a graphic is projected at the pointed position; and
performing, in a case where an image is scrolled in a specific range of the input image, control so that the graphic corresponding to the specific range moves in a direction in accordance with the scrolling, and
the specific range is a range corresponding to a specific window included in the input image.

11. A non-transitory computer readable medium that stores a program, wherein the program causes a computer to execute a control method for a projection apparatus, the control method comprising:
performing control so that an input image is projected onto a projection plane;
detecting a position pointed to by a pointer on the projection plane;
performing control so that the input image is projected and a graphic is projected at the pointed position; and
performing, in a case where an image is scrolled in a specific range of the input image, control so that the graphic corresponding to the specific range moves in a direction in accordance with the scrolling, and
the specific range is a range corresponding to a specific window included in the input image.

12. A projection apparatus comprising:
a projection optical system configured to project an input image onto a projection plane, and
a position detector configured to detect a position pointed to by a pointer on the projection plane; and
a controller configured to perform control so that the projection optical system projects the input image and projects a graphic at the position detected by the position detector, wherein
in a case where an image is scrolled in a specific range of the input image, the controller performs control so that the graphic corresponding to the specific range moves in a direction in accordance with the scrolling, and
the controller performs control so that the graphic moves in a predetermined cycle during scrolling the image in the specific range.

13. A projection apparatus comprising:
a projection optical system configured to project an input image onto a projection plane, and
a position detector configured to detect a position pointed to by a pointer on the projection plane; and
a controller configured to perform control so that the projection optical system projects the input image and projects a graphic at the position detected by the position detector, wherein
in a case where an image is scrolled in a specific range of the input image, the controller performs control so that the graphic corresponding to the specific range moves in a direction in accordance with the scrolling, and
the controller performs control so that the graphic does not move while scrolling of an image in the specific range is performed, and the graphic moves at timing when the scrolling of the image in the specific range ends.

14. A projection apparatus comprising:
a projection optical system configured to project an input image onto a projection plane, and
a position detector configured to detect a position pointed to by a pointer on the projection plane; and
a controller configured to perform control so that the projection optical system projects the input image and projects a graphic at the position detected by the position detector, wherein
in a case where an image is scrolled in a specific range of the input image, the controller performs control so that the graphic corresponding to the specific range moves in a direction in accordance with the scrolling, and
the controller performs control so that the graphic does not move while pointing by the pointer is continuing, and the graphic moves at a timing when the pointing ends.

* * * * *